(12) United States Patent
Weber

(10) Patent No.: US 11,258,338 B2
(45) Date of Patent: Feb. 22, 2022

(54) SLOT WALL INSULATION FOR A STATOR OF AN ELECTRIC MOTOR

(71) Applicant: AUDI AG, Ingolstadt (DE)

(72) Inventor: Korbinian Weber, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 651 days.

(21) Appl. No.: 16/178,805

(22) Filed: Nov. 2, 2018

(65) Prior Publication Data
US 2019/0149023 A1 May 16, 2019

(30) Foreign Application Priority Data
Nov. 13, 2017 (DE) .......................... 102017220123.1

(51) Int. Cl.
| | |
|---|---|
| *H02K 3/34* | (2006.01) |
| *H02K 3/24* | (2006.01) |
| *H02K 3/04* | (2006.01) |
| *H02K 1/16* | (2006.01) |
| *H02K 15/02* | (2006.01) |
| *H02K 5/08* | (2006.01) |
| *H02K 3/12* | (2006.01) |
| *H02K 1/14* | (2006.01) |
| *H02K 3/487* | (2006.01) |

(52) U.S. Cl.
CPC ............. *H02K 15/028* (2013.01); *H02K 3/24* (2013.01); *H02K 3/345* (2013.01); *H02K 5/08* (2013.01); *H02K 1/148* (2013.01); *H02K 3/12* (2013.01); *H02K 3/487* (2013.01)

(58) Field of Classification Search
CPC .... H02K 15/028; H02K 15/085; H02K 15/10; H02K 3/22; H02K 3/12; H02K 3/24; H02K 3/04; H02K 3/30; H02K 3/34; H02K 3/345; H02K 3/487; H02K 5/08; H02K 1/04; H02K 1/16; H02K 1/148
See application file for complete search history.

(56) References Cited

U.S. PATENT DOCUMENTS

| | | | | | |
|---|---|---|---|---|---|
| 2,727,161 | A | * | 12/1955 | Kilner | ...................... H02K 3/24 310/64 |
| 2,755,395 | A | * | 7/1956 | Kilner | ...................... H02K 3/24 310/64 |
| 2,900,538 | A | | 8/1959 | Tudge | |

(Continued)

FOREIGN PATENT DOCUMENTS

| | | |
|---|---|---|
| CN | 1066346 A | 11/1992 |
| DE | 1 017 265 B | 10/1957 |

(Continued)

OTHER PUBLICATIONS

European Search Report dated Feb. 13, 2019, in connection with corresponding EP Application No. 18 20 0302.0 (12 pgs., including machine-generated English translation).

(Continued)

*Primary Examiner* — Edgardo San Martin
(74) *Attorney, Agent, or Firm* — Maier & Maier, PLLC

(57) ABSTRACT

An electric motor including a stator body with a stator laminated core and a stator slot, wherein the stator slot has a slot wall with a slot wall insulation for electrical insulation, as well as at least one electrical conductor which is received by the stator slot, the slot wall insulation having a tooth-shaped configuration.

6 Claims, 2 Drawing Sheets

(56) References Cited

U.S. PATENT DOCUMENTS

| | | | | |
|---|---|---|---|---|
| 2,967,346 | A * | 1/1961 | McMaster | H02K 15/16 |
| | | | | 29/596 |
| 4,900,956 | A * | 2/1990 | Gavilondo | H02K 3/24 |
| | | | | 310/61 |
| 4,994,700 | A | 2/1991 | Bansal et al. | |
| 5,276,374 | A * | 1/1994 | Geller | H02K 3/24 |
| | | | | 310/260 |
| 5,468,907 | A | 11/1995 | Frankenhauser et al. | |
| 5,886,434 | A * | 3/1999 | Nygard | H02K 3/24 |
| | | | | 310/61 |
| 6,856,053 | B2 * | 2/2005 | LeFlem | H02K 9/197 |
| | | | | 310/54 |
| 7,482,725 | B2 * | 1/2009 | Down | H02K 3/24 |
| | | | | 310/215 |
| 9,300,178 | B2 * | 3/2016 | Shiga | H02K 3/345 |
| 10,424,985 | B2 * | 9/2019 | Grubel | H02K 15/12 |
| 10,566,854 | B2 * | 2/2020 | Koizumi | H02K 3/345 |
| 2020/0014266 | A1 * | 1/2020 | Oechslen | H02K 1/04 |

FOREIGN PATENT DOCUMENTS

| | | | | |
|---|---|---|---|---|
| DE | 19964061 | A1 | 7/2001 | |
| DE | 20308665 | U1 | 12/2004 | |
| DE | 102013204047 | A1 * | 9/2014 | H02K 3/24 |
| DE | 102013209333 | A1 | 11/2014 | |
| DE | 102017222635 | A1 * | 6/2019 | H02K 3/24 |
| DE | 102018218211 | A1 * | 4/2020 | H02K 3/34 |
| GB | 336 497 | A | 10/1930 | |
| JP | 2002-247813 | A | 8/2002 | |
| JP | 2003-070201 | A | 3/2003 | |
| JP | 3808641 | B2 | 8/2006 | |
| JP | 2014-179264 | A | 9/2014 | |
| WO | 92/20140 | A1 | 11/1992 | |
| WO | 2017-047247 | A1 | 3/2017 | |

OTHER PUBLICATIONS

Examination Report dated May 12, 2020, in corresponding European patent application No. 18 200 302.0 including partial machine-generated English language translation; 12 pages.

European Office Action dated Jan. 9, 2020, in connection with corresponding EP Application No. 18 200 302.0 (10 pgs., including machine-generated English translation).

Chinese Office Action dated May 7, 2020, in connection with corresponding CN Application No. 201811337272.5 (18 pgs., including machine-generated English translation).

German Office Action dated Oct. 22, 2018, in connection with corresponding DE Application No. 10 2017 220 123.1 (14 pgs., including machine-generated English translation).

Chinese Office Action dated Feb. 2, 2021, in connection with corresponding CN Application No. 201811337272.5 (6 pp., including machine-generated English translation).

Office Action dated Jun. 2, 2021 in corresponding Chinese Application No. 201811337272.5; 9 pages including partial English-language summary.

* cited by examiner

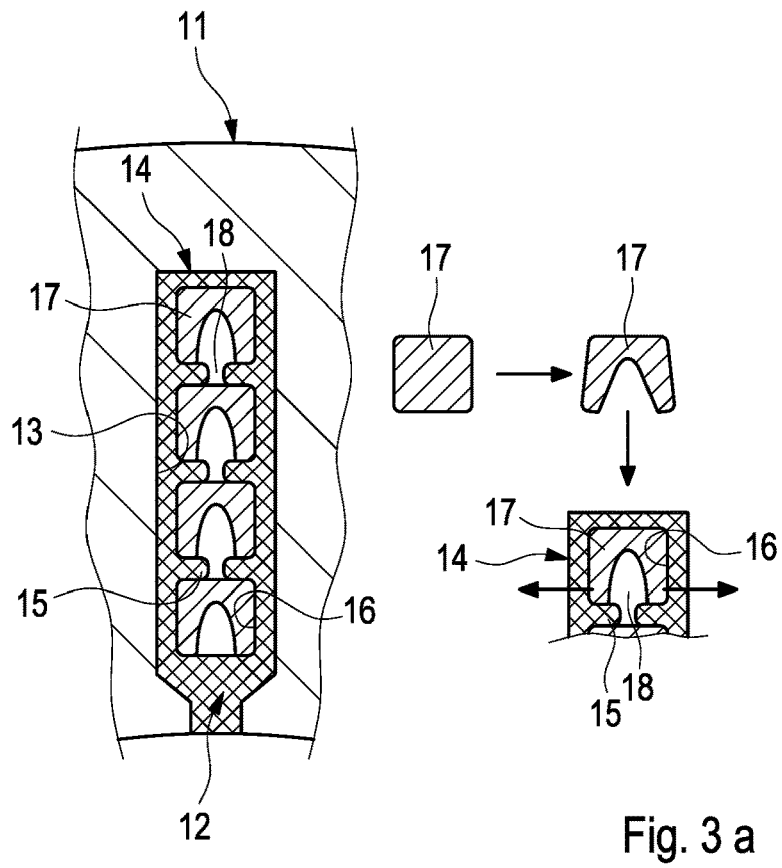
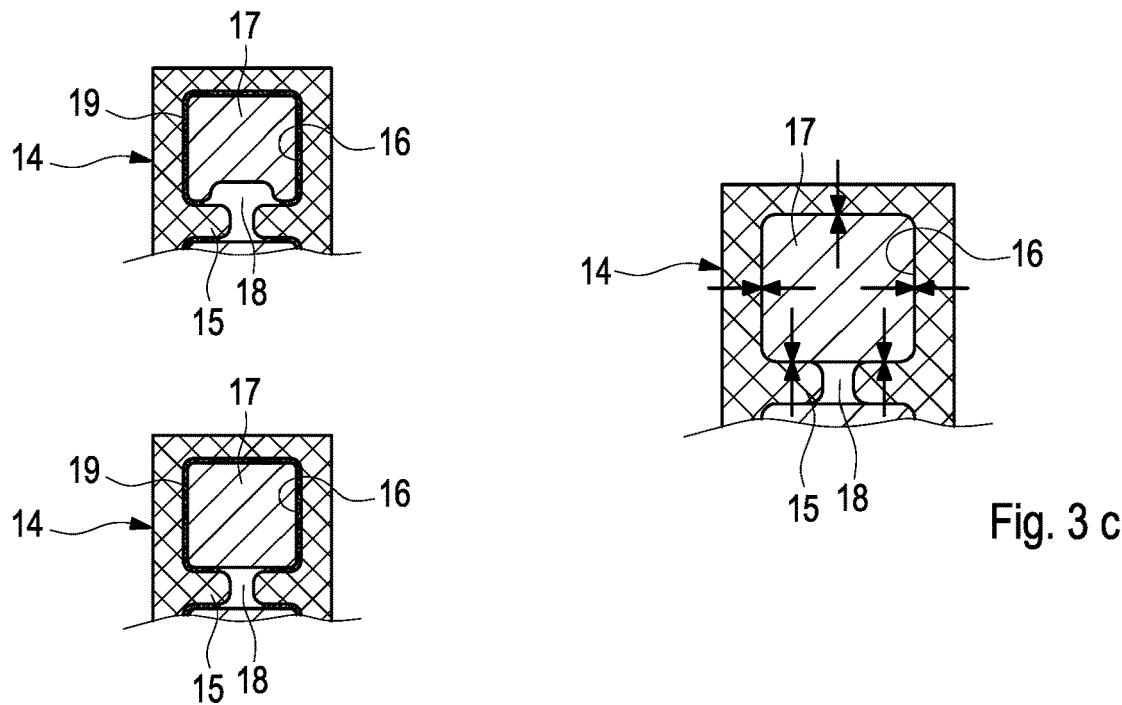
Fig. 3 a
Fig. 3 b
Fig. 3 c

SLOT WALL INSULATION FOR A STATOR OF AN ELECTRIC MOTOR

FIELD

The invention relates to an electric motor with a slot wall insulation and a method for producing an electric motor with a slot wall insulation.

BACKGROUND

In smaller electric motors it is customary to overmold the stator laminated cores with plastic for electrical insulation, whereby the insulation both in the stator slots, as slot wall insulation, as well as on the end faces of the laminated stack is completely formed and connected and can be produced in a single manufacturing step. After applying the insulation, electrical conductors are introduced into the stator slots and then impregnated, in order to prevent movements of the electrical conductors and to assure the best possible thermal conductivity of the electrical conductors to the stator laminated core. The impregnation is produced with a resin or similar material.

However, the thermal conductivity of slot insulations is a power-limiting factor for electric motors. In traditional electric motor cooling architectures, usually the lost heat is discharged to the outside from the electrical conductors by the impregnation and insulation materials via the stator laminated core. Thus, a high thermal conductivity of the slot wall insulation and the thinnest possible wall thickness of the slot wall insulation are essential for cooling the electric motor and hence for the power.

From DE 10 2013 209 333 A1 there is known a rotor or stator of an electrical machine in which an insulation material is deposited on the stator slots in an injection molding process, enclosing them.

DE 20 308 665 U1 discloses an internal rotor type electric motor, in which a stator of the electric motor is provided with an insulation layer in an injection molding process.

From DE 19 964 061 A1 there is known an electric motor, especially for handheld power tools, in which a stator laminated core of the electric motor is equipped with a slot insulation which is applied in an injection molding process.

In previously known injection-molded plastic slot wall insulations, it is possible for the thermal conduction and castability properties of the plastic material to be contradictory to each other, especially when the wall thickness of the slot wall insulation is slight. An easily cast plastic that forms thin insulation walls usually has poor thermal conductivity, and vice versa. Increasing the thermal conductivity in plastics is accomplished by adding filler material. But, on the other hand, filler materials worsen the flowing properties of the plastic during the injection molding process.

Furthermore, the impregnation process is basically detrimental from the standpoint of process and quality. The wetting of the electrical conductor and the slot wall insulation with an introduced impregnation material, which may be an epoxy/polyester resin or a similar material, furthermore cannot be controlled directly on account of poor access, and therefore it cannot be assured.

Therefore, the object of the invention is to provide an electric motor with a slot wall insulation enabling an improved heat dissipation.

SUMMARY

The subject of the present invention is an electric motor comprising a stator body with a stator laminated core and at least one stator slot, wherein the at least one stator slot has a slot wall with a slot wall insulation for electrical insulation, as well as at least one electrical conductor, the stator slot being designed to receive the electrical conductor.

According to the invention, the slot wall insulation has a tooth-shaped configuration pointing away from the slot wall. The tooth-shaped configuration is preferably formed on both sides along the stator wall as a contour pointing toward the interior of the stator slot. Preferably, the tooth-shaped configuration has protuberances and recesses, the protuberances being formed as teeth which reach into the interior of the stator slot. Oppositely situated teeth are preferably formed without touching each other in this case. The tooth-shaped configuration may alternatively be wavy-shaped or have some other geometrical configuration. The number of tooth-shaped configurations can be adapted to the number of electrical conductors. The tooth-shaped configuration is designed to fix the position of at least one electrical conductor inside the respective stator slot. By fixing or establishing the electrical conductor by the tooth-shaped configuration, little or no additional impregnation of the electrical conductors is needed in order to prevent mechanical movements of the electrical conductors and thus wear and tear of the insulation.

In one embodiment, the slot wall insulation is formed on a surface of at least one stator sheet of the stator laminated core. In this case, the slot wall insulation may be formed directly on the stator sheet in an injection molding process. This affords the benefit that the fabrication of the tooth-shaped configuration of the slot wall insulation according to the invention does not involve an increased manufacturing expense, but rather can be produced in a single step with the stator sheet. The direct formation of the toothed slot wall insulation on the stator sheet furthermore enables a good heat dissipation.

Preferably, the slot wall insulation forms at least one recess by the tooth-shaped configuration, which is designed to establish the position of at least one electrical conductor arranged in the stator slot. The at least one recess is preferably formed between two teeth of the tooth-shaped slot wall insulation. The teeth preferably form a boundary for one electrical conductor so that it is retained in its position. Preferably, the number of recesses corresponds to the number of electrical conductors to be arranged in the stator slot. Especially advantageously, the recesses of the tooth-shaped slot wall insulation are substantially rectangular, the shape of the recess being formed independently of the shape of the electrical conductor. By the fixing or establishing of electrical conductors by the tooth-shaped configuration, little or no additional impregnation of the electrical conductors is needed to prevent mechanical movements of the electrical conductors and thus wear and tear of the insulation. This likewise shortens the manufacturing process, since the process step of impregnation is eliminated.

Especially preferably, the tooth-shaped configuration is designed to hold the electrical conductors arranged in the stator slot with a given spacing from each other. The electrical conductors are preferably introduced into the stator slot axially with respect to the axis of rotation of the stator. The tooth-shaped configuration arranges the electrical conductors at a spacing from each other dictated by the teeth. This affords the benefit that the electrical conductors are formed free of contact with each other.

In one embodiment, the slot wall insulation forms gaps due to the tooth-shaped configuration. The gaps are formed by two teeth that lie opposite each other of the tooth-shaped configuration, the two oppositely situated teeth being formed free of contact with each other. The gap is preferably formed as a fluid duct and is designed to carry a cooling fluid. This affords the benefit that a fluid duct can be formed for each electrical conductor even with customary square-profiled conductors. The fluid ducts can carry a fluid, especially a cooling fluid, along the electrical conductors. In this way, the tooth-shaped configuration of the slot wall insulation can achieve an improved, direct cooling of the electrical conductors (direct conductor cooling) of the electric motor. Thus, the electrical conductors are cooled directly in a cooling process during which a cooling fluid flows around the electrical conductors in the fluid ducts. A further benefit is that, with such a direct conductor cooling, thinner insulation walls can be produced as compared to the traditionally cooled machines with injection-molded insulation, as the slot wall insulation no longer constitutes the primary heat dissipation path, because the cooling of the electrical conductors occurs directly at the fluid. Hence, even less thermally conductive materials that are optimized for injection molding can be used for the injection-molded insulation, without reducing the cooling and thus also reducing the power of the machine.

In another embodiment, at least one electrical conductor is formed or stamped out. The electrical conductor may be formed so as to have a shaping in a region not in contact with the slot wall insulation, this shaping being designed to hold and convey a fluid so that a fluid can flow along the shaping of the formed electrical conductor. Preferably, the shaping is designed to widen the gap formed by two opposite-lying teeth and thus form or enlarge the fluid duct. Optionally, the surface of the electrical conductor that is in contact with the slot wall insulation is formed corresponding to the shaping of the slot wall insulation. By the use of a bare electrical conductor, which enables an improved convective heat transfer from the electrical conductor to the cooling fluid, and which additionally has a forming or stamping out, the benefit is afforded that the tooth-shaped configuration can enlarge the electrical creepage distance, i.e., the insulation from one electrical conductor to another electrical conductor, between the individual electrical conductors without having to place the electrical conductors geometrically far apart from each other.

In one preferred embodiment, the at least one electrical conductor is formed in a U-shape. A U-shaped configuration is especially advantageous because it allows the largest possible flow through the fluid duct formed by the shaping and the gap. Alternatively, the electrical conductor may be V-shaped, rectangular, or arc-shaped, or have some other geometrical shape enabling the conveying of a fluid.

In one embodiment, the electrical conductor can be glued or clamped or press-fitted in the stator slots. This makes possible a rapid introduction of the at least one electrical conductor in one of the stator slots, so that the manufacturing process can be carried out quickly. Furthermore, the position of the electrical conductor in the stator slot can be established in this way, in addition to the tooth-shaped configuration, so that a mechanical movement of the electrical conductors can be prevented.

The subject of the invention is also a method for producing the electric motor with one of the above described features, comprising a stator body with a stator laminated core and at least one stator slot, wherein the at least one stator slot has a slot wall with a slot wall insulation for the electrical insulation, and the stator slot is designed to receive electrical conductors.

The method involves, in a first step a), the fabrication of a stator with the stator laminated core and the at least one stator slot in an injection molding process. At the same time, in a step b), there is formed a tooth-shaped configuration of the slot wall insulation during the injection molding. The tooth-shaped configuration is formed as a tooth-shaped contour of the slot wall insulation on a stator sheet in a single step of the injection molding process.

In a further step c), there is provided at least one electrical conductor. The electrical conductor is introduced into the tooth-shaped slot wall insulation in a step d). The electrical conductor is preferably introduced axially into the recesses formed by the tooth-shaped configuration of the slot wall insulation. In this case, the tooth-shaped configuration of the slot wall insulation establishes the position of the electrical conductor that has been introduced, thereby preventing a mechanical movement of the electrical conductor. Thanks to the introduction of the electrical conductor into the tooth-shaped slot wall insulation, a gap is formed in a step e) by the tooth-shaped configuration. The gap is preferably formed as a fluid duct. The gap is formed by two oppositely situated teeth of the tooth-shaped configuration of the slot wall insulation, the two oppositely situated teeth being formed with no contact between them. The gap formed as a fluid duct preferably conveys a cooling fluid. In this way, an electrical conductor can be cooled directly by the cooling fluid flowing along it. Thanks to the tooth-shaped configuration and the fixing of the position of the electrical conductor by the tooth-shaped configuration, no additional impregnation of the electrical conductor is needed to prevent a mechanical movement. In a further step f), the electric motor is placed in operation and a fluid is run through the gap. This sets in motion a cooling process and the electrical conductor and hence the electric motor manufactured according to the invention are cooled.

In one preferred enhancement of the method, the electrical conductor is formed before being introduced into the tooth-shaped slot wall insulation.

Preferably, the shaping widens the gap formed by two oppositely situated teeth and hence enlarges the fluid duct. Advantageously, the electrical conductor will be formed in particular in a U-shape, thus enlarging the gap such that the largest possible quantity of a fluid can be conveyed through the gap. This results in an improved cooling of the electrical conductors and thus of the electric motor.

The subject of the invention is also an electric vehicle comprising an electric motor as described above according to one of the above-described features.

BRIEF DESCRIPTION OF DRAWINGS

The invention shall be represented schematically with the aid of embodiments in the drawings and described further with reference to the drawings. There are shown:

FIG. 3a one possible securing of an electrical conductor in one embodiment of the tooth-shaped configuration of the slot wall insulation according to the invention;

FIG. 3b one possible securing of an electrical conductor in one embodiment of the tooth-shaped configuration of the slot wall insulation according to the invention;

FIG. 3c one possible securing of an electrical conductor in one embodiment of the tooth-shaped configuration of the slot wall insulation according to the invention.

DETAILED DESCRIPTION

Figure 1:
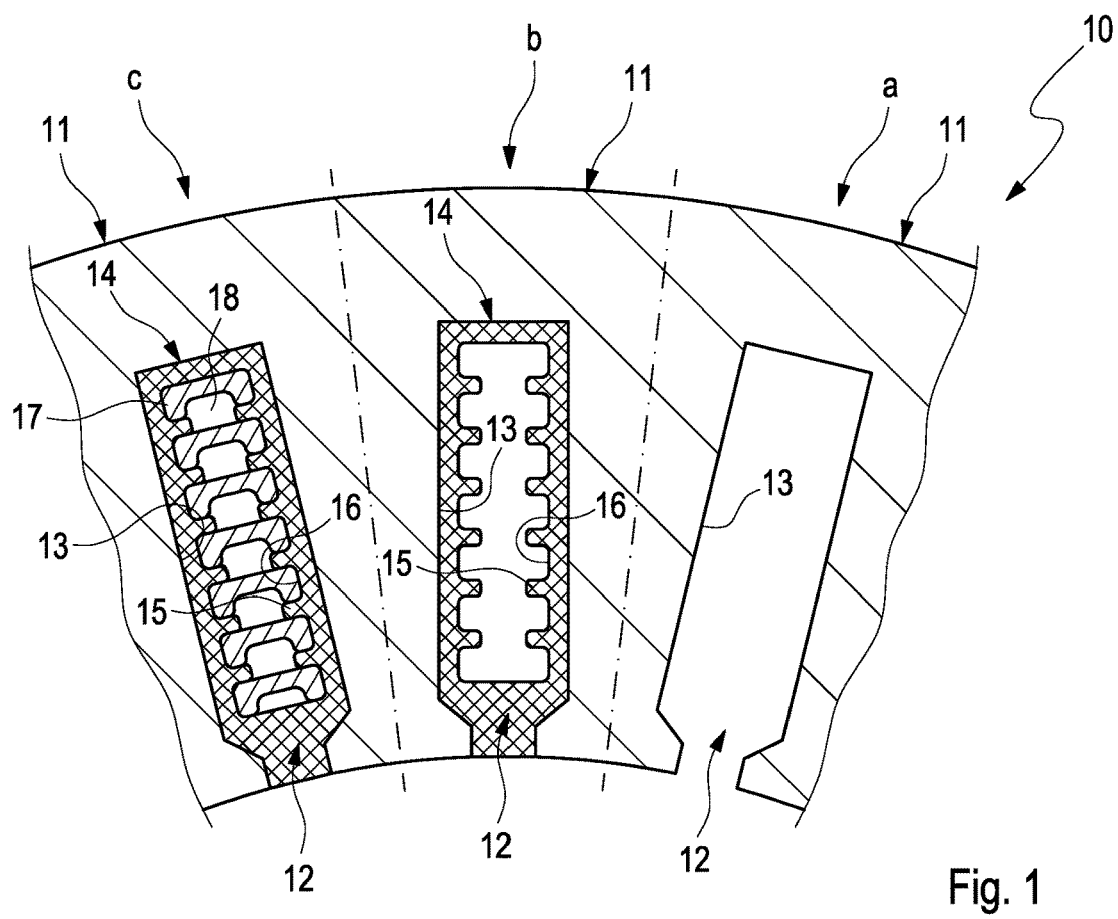
FIG. 1 a schematic representation of an electric motor with a stator laminated core with an embodiment of a tooth-shaped configuration of a slot wall insulation according to the invention.

FIG. 1 shows a schematic representation of a stator laminated core 11 of an electric motor 10 with a tooth-shaped configuration of a slot wall insulation 14 according to the invention. The layout of the slot wall insulation 14 according to the invention is shown in three sections a, b and c. In a first section a, a stator laminated core 11 is shown, in which a stator slot 12 is represented, corresponding to a common configuration of a stator slot 12 with a slot wall 13.

In a second section b, a stator laminated core 11 is shown with a stator slot 12 and a slot wall 13, having a tooth-shaped slot wall insulation 14 according to the invention. The tooth-shaped configuration of the slot wall insulation 14 is preferably formed in an injection-molding process during the fabrication of the stator laminated core 11 of the electric motor 10. The tooth-shaped configuration of the slot wall insulation 14 is formed preferably along both sides of the slot wall 13 as a contour pointing into the interior of the stator slot 12. Preferably, the tooth-shaped configuration has protuberances and recesses, the protuberances being formed as teeth 15 which reach into the interior of the stator slot 12. Oppositely situated teeth 15 are preferably formed without contacting each other. The tooth-shaped configuration may alternatively be wavy shaped or have some other geometrical configuration. The number of tooth-shaped configurations may be adapted to the number of electrical conductors 17. The tooth-shaped configuration is designed to secure the position of at least one electrical conductor 17. The slot wall insulation 14, moreover, is preferably made of a plastic.

In a third section c, the tooth-shaped slot wall insulation 14 is shown with electrical conductors 17 introduced into recesses of the toothed configuration. The electrical conductors 17 here are shown formed, especially in a U-shape. Between two mutually opposite teeth 15 of the tooth-shaped slot wall insulation 14 there is formed a gap 18, which is widened by the U-shaped shaping of the electrical conductors 17. The gap 18 in particular is formed as a fluid duct, so that a fluid can be conveyed directly along the electrical conductors 17, and hence the electrical conductors 17 can be cooled directly. Thus, the electrical conductors 17 are cooled directly in a cooling process during which a cooling fluid flows around the electrical conductors 17 in the fluid ducts 18, wherein the entire stator slot 12 can be bathed in the fluid. A further benefit which results is that, with such a direct conductor cooling, thinner insulation walls can be fabricated as compared to traditionally cooled machines with injection-molded insulation, since the slot wall insulation 14 no longer constitutes the primary heat dissipation path, because the cooling of the electrical conductors 17 occurs directly at the fluid. Hence, even less thermally conductive materials that are optimized for the casting process can be used for the injection-molded insulation, without reducing the cooling and thus without also reducing the power of the machine.

FIG. 1 furthermore shows the method of fabrication of an electric motor 10 with the slot wall insulation 14 according to the invention. The method for the fabrication of an electric motor 10 involves an electric motor 10 with a stator body, comprising a stator laminated core 11 and at least one stator slot 12, wherein the stator slot 12 has a slot wall 13 with a slot wall insulation 14 for the electrical insulation, and the stator slot 12 is designed to receive electrical conductors 17. In a first step a), the fabrication of a stator with the stator laminated core 11 and the at least one stator slot 12 is carried out in an injection molding process. At the same time, in a step b), there is formed a tooth-shaped configuration of the slot wall insulation 14 during the injection molding. In a further step c), there is provided at least one electrical conductor 17, which is introduced into the stator slot 12 in a step d). The electrical conductor 17 is preferably introduced axially into the tooth-shaped configuration of the slot wall insulation 14. The tooth-shaped configuration of the slot wall insulation 14 establishes the position of the introduced electrical conductor, thereby preventing any mechanical movement of the electrical conductor 17, so that a mechanical movement of the electrical conductor 17 is prevented. Thanks to the introducing of the electrical conductor 17 into the tooth-shaped slot wall insulation 14, a gap 18 is formed in a step e) by the tooth-shaped configuration. The gap 18 is preferably formed as a fluid duct. In this way, an electrical conductor 17 is cooled directly on top of the cooling fluid flowing along it. In a further step f), the electric motor 10 is placed in operation and a fluid runs through the gap 18. This sets in motion a cooling process and the electric motor is cooled. Moreover, as is shown in section c, the electrical conductor 17 is formed before being introduced into the tooth-shaped slot wall insulation 14. The forming widens the gap 18 formed and hence enlarges the fluid duct. Advantageously, the electrical conductor 17 will be formed or stamped, in particular in a U-shape, thus enlarging the gap 18 such that the largest possible quantity of a fluid can be conveyed through the gap 18. This results in an improved cooling of the electrical conductor 17 and thus of the electric motor 10.

Figure 2:
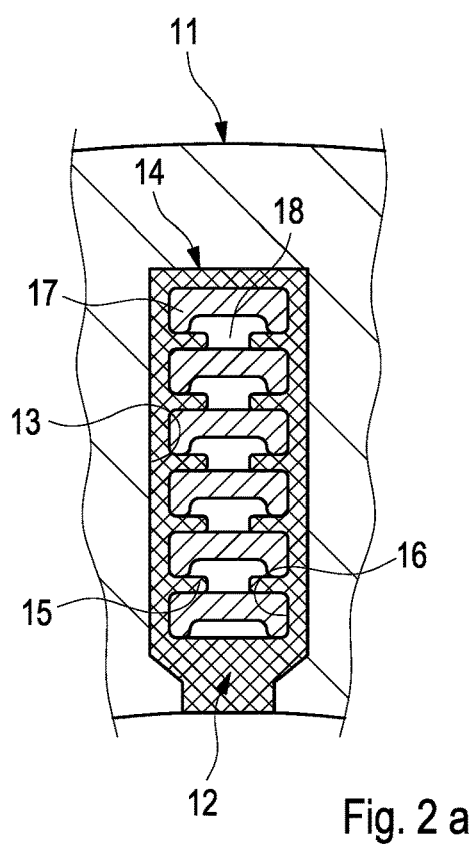
FIG. 2a a schematic representation of another embodiment of a tooth-shaped configuration of a slot wall insulation according to the invention with formed electrical conductors installed.
FIG. 2b a schematic representation of yet another embodiment of a tooth-shaped configuration of a slot wall insulation according to the invention with customary rectangular-shaped electrical conductors installed.
Figure 2:
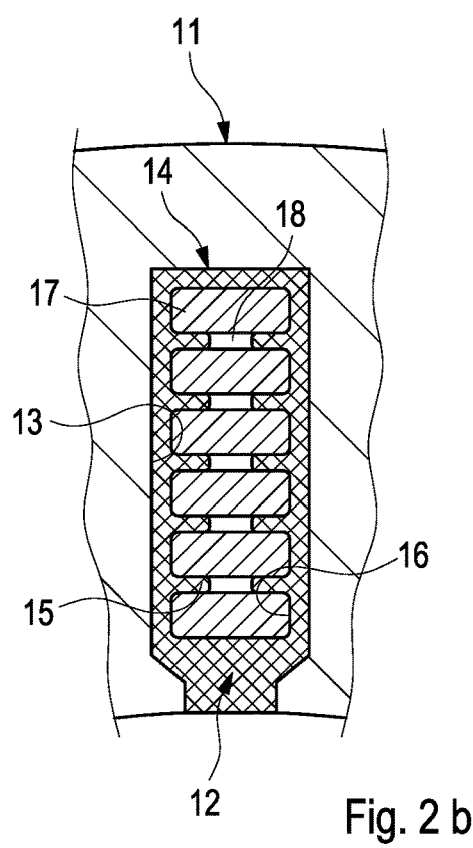

FIG. 2a shows a schematic representation of a tooth-shaped configuration of a slot wall insulation 14 according to the invention with formed electrical conductors 17 installed. The tooth-shaped configuration is formed preferably along both sides of the slot wall 13 as a contour pointing into the interior of the stator slot 12. Preferably, the tooth-shaped configuration has protuberances and recesses 16, the protuberances being formed as teeth 15 which reach into the interior of the stator slot 12. The oppositely situated teeth 15 are formed without contacting each other. The tooth-shaped configuration may alternatively be wavy shaped or have some other geometrical configuration. The number of the tooth-shaped configurations may preferably be adapted to the number of electrical conductors 17. Preferably, the tooth-shaped configuration is designed to secure the position of an electrical conductor 17. Thanks to the fixation or securing of the electrical conductor 17 by the tooth-shaped configuration, little or no additional impregnation of the electrical conductor 17 is needed in order to prevent mechanical movements of the electrical conductor 17 and thus wear and tear on the insulation.

FIG. 2b shows a schematic representation of a tooth-shaped configuration of a slot wall insulation according to the invention with customary rectangular electrical conductors 17 installed. The tooth-shaped configuration of the slot wall insulation 14 forms gaps 18 through which a fluid can be conveyed. The configuration according to the invention thus enables a direct cooling of the electrical conductor 17 by means of a fluid conveyed through the gaps 18, even when using formerly customary rectangular shaped electrical conductors 17.

FIG. 3a shows one possible securing of an electrical conductor in the tooth-shaped configuration of the slot wall insulation 14 according to the invention. A stator core is shown, having a stator slot with a slot wall insulation, the slot wall insulation having the toothed configuration according to the invention. In the toothed configuration of the slot wall insulation 14, electrical conductors are arranged axially in each of the recesses formed. The electrical conductors are formed in a U-shape, outlining a cavity in a recess of the tooth-shaped configuration, which, together with a gap formed by two mutually opposite teeth of the tooth-shaped configuration, forms a fluid duct. The electrical conductors are clamped in the tooth-shaped configuration, especially in the recesses.

FIG. 3a furthermore shows a method for installing an electrical conductor 17 in a tooth-shaped configuration of the slot wall insulation 14 according to the invention. Here, an electrical conductor 17, which is preferably rectangular in shape, is formed in a U-shape such that the two legs of the U-shaped configuration stick out to the outside at an angle. By pressing together the protruding legs of the U-shaped conductor, the latter is clamped in a recess of the tooth-shaped configuration. Thus, the U-shaped stamped-out electrical conductor is secured by a spring action in the slot wall insulation.

FIG. 3b shows an alternatively possible securing of an electrical conductor 17 in the tooth-shaped configuration of the slot wall insulation 14 according to the invention. Shown here is a tooth-shaped slot wall insulation 14, in which a U-shaped stamped-out electrical conductor 17 is introduced, whereas, between the slot wall insulation 14 and the electrical conductor 17, a widely spread gap is formed, so that the electrical conductor 17 is clamped in a recess 16 of the slot wall insulation 14.

FIG. 3b furthermore also shows an alternatively possible method for securing an electrical conductor 17 in the tooth-shaped configuration of the slot wall insulation 14 according to the invention; in this case, an electrical conductor 17 is inserted in a recess 16 of the tooth-shaped configuration of the slot wall insulation 14 at a distance relative the slot wall insulation 14, whereby an adhesive is placed on the electrical conductor 17 or on the slot wall insulation 14, so that the electrical conductor 17 is glued in the tooth-shaped configuration of the slot wall insulation 14 by way of a glue gap 19. Preferably, in this case, the gluing is effected by a thermal activation of the adhesive.

FIG. 3c shows another alternatively possible securing of an electrical conductor 17 in the tooth-shaped configuration of the slot wall insulation 14 according to the invention. In this case a tooth-shaped slot wall insulation 14 is shown, in which a rectangular electrical conductor 17 is press-fitted.

The alternative securing shown in FIG. 3c is realized by means of a press fit of the electrical conductor 17 in the recess 16 of the tooth-shaped configuration of the slot wall insulation 14.

The invention claimed is:

1. An electric motor comprising:
a stator body with a stator laminated core and at least one stator slot, wherein the at least one stator slot has a slot wall with a slot wall insulation for electrical insulation, as well as at least one electrical conductor, wherein the slot wall insulation has a tooth-shaped configuration which establishes a position for at least one U-shaped electrical conductor disposed in the at least one stator slot, wherein the tooth-shaped configuration receives the at least one electrical conductor in the at least one stator slot within a gap is formed between two mutually opposite teeth protruding toward an interior of the stator slot from opposite sides of the stator wall, wherein a first electrical conductor and a second electrical conductor are received in adjacent stator slots forming a fluid duct between a top side of the first electrical conductor and the U-shaped bottom side of the second electrical conductor.

2. The electric motor as claimed in claim 1, wherein the slot wall insulation is formed on a surface of at least one stator sheet of the stator laminated core.

3. The electric motor as claimed in claim 1, wherein at least one electrical conductor is formed or stamped out.

4. The electric motor as claimed in claim 1, wherein the at least one electrical conductor can be glued or clamped or press-fitted in the at least one stator slot.

5. A method for producing an electric motor with a stator body with a stator laminated core and at least one stator slot, wherein the at least one stator slot has a slot wall with a slot wall insulation for electrical insulation, and the at least one stator slot is designed to receive electrical conductors, the method comprising:
a) fabricating a stator with the stator laminated core and the at least one stator slot in an injection molding;
b) simultaneously forming of a tooth-shaped configuration of the slot wall insulation during the injection molding;
c) providing of at least one U-shaped electrical conductor;
d) inserting the at least one U-shaped electrical conductor into the tooth-shaped slot wall insulation;
e) forming at least one gap by the tooth-shaped configuration between two mutually opposite teeth protruding toward an interior of the stator slot from opposite sides of the stator wall, wherein a first electrical conductor and a second electrical conductor are received in adjacent stator slots forming a fluid duct between a top side of the first electrical conductor and the U-shaped bottom side of the second electrical conductor; and
f) placing the electric motor in operation and running a fluid through the at least one gap.

6. The method as claimed in claim 5, wherein the at least one electrical conductor is formed before being introduced into the tooth-shaped slot wall insulation.

* * * * *